W. H. BOYER.

Assignor, by mesne Assignments, to A. GREENLEAF.

Sewing-Machine Table.

No. 8,333. Reissued July 16, 1878.

Witness
John R. Mason
Chas. A. Hersey

Inventor
William H. Boyer
by Wm. Franklin Seavey Atty

UNITED STATES PATENT OFFICE.

WILLIAM H. BOYER, OF BALTIMORE, MARYLAND, ASSIGNOR, BY MESNE ASSIGNMENTS, TO ABNER GREENLEAF, OF SAME PLACE.

IMPROVEMENT IN SEWING-MACHINE TABLES.

Specification forming part of Letters Patent No. 143,611, dated October 14, 1873; Reissue No. 8,333, dated July 16, 1878; application filed June 5, 1878.

*To all whom it may concern:*

Be it known that I, WILLIAM H. BOYER, of Baltimore, in the county of Baltimore and State of Maryland, have invented certain new and useful Improvements in Fastenings for Sewing-Machine Covers, &c.; and I do hereby declare that the following is a full, clear, and exact description of my invention, that will enable others skilled in the art to which it appertains to make and use the same, reference being had to the accompanying drawings, and to the letters of reference marked thereon, which form a part of this specification.

Figure 1:
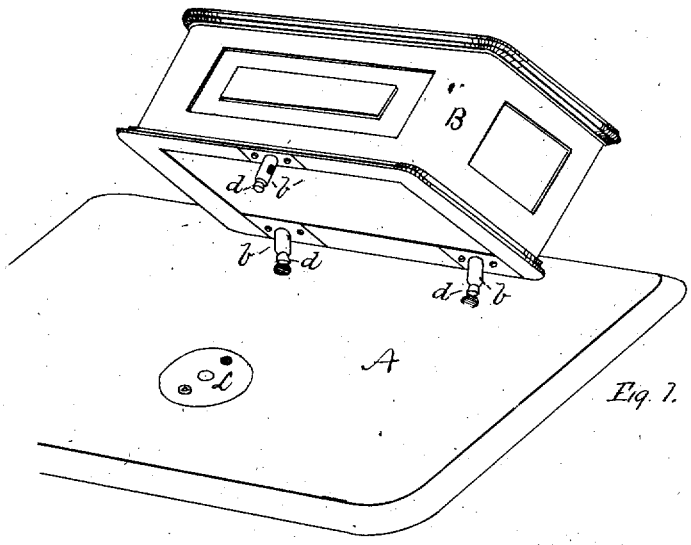
Figure 2:
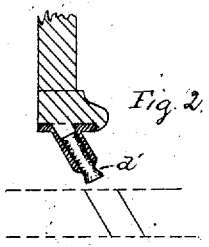

Figure 1 is a perspective view of a sewing-machine table-top and machine-cover, with fastenings having my improvements attached; Fig. 2, a sectional view of fastening, illustrating method of securing buffer.

My invention consists of improvements in fastenings for sewing-machine covers and similar purposes, and is designed to prevent said fastenings from scratching or marring the top of the machine-table or other surfaces with which they may come in contact.

These fastenings usually consist of downwardly-projecting metallic pegs, permanently secured to the lower edge of the cover, and are commonly three in number, two taking the place of hinges, and the third serving as a staple to secure the lock-bolt.

Defining my invention still further, it consists in providing these projecting fastenings with buffers or cushions of soft material, so arranged as to project beyond the surface of the metallic part of the fastening and act as a guard or fender.

My device will be understood by reference to the annexed drawings.

A represents the top of a sewing-machine table, and B the machine-cover. At *b b b'* are fastenings, *b b* showing inclined pegs, entering mortises in the top A and securing the rear of the cover, and *b'* showing the staple securing the bolt of the lock L. These fastenings *b b b'* are provided with a cushion, *d*, of rubber, leather, or other soft material, which projects beyond the metal of the peg, as at *d'*, and serves as a fender or buffer to prevent the scratching of the table-top.

What I claim as my invention, and desire to secure by Letters Patent, is—

1. A fastening for sewing-machine covers, &c., consisting of a metallic hook or peg, adapted to enter openings in the table-top and retain the cover in place, provided with a buffer or cushion of soft material projecting beyond the metallic part of the fastening, as shown, for the purposes specified.

2. A fastening for sewing-machine covers, &c., consisting of a metallic hook or peg, adapted to enter openings in the table-top and retain the cover in place, provided with a cavity for the reception and retention of a buffer or cushion, in combination with such buffer or cushion, substantially as and for the purposes set forth.

3. The flanged pegs *b b'*, having a conically-shaped hole therein, in combination with buffers or cushions of soft material inserted therein, substantially as and for the described purposes.

In testimony that I claim the foregoing I have hereunto set my hand this 30th day of May, 1878.

WM. H. BOYER.

Witnesses:
WM. H. BAYZAND,
JNO. C. FOSTER.